(12) United States Patent
Mathew et al.

(10) Patent No.: US 10,884,099 B2
(45) Date of Patent: Jan. 5, 2021

(54) COVERAGE OPTIMIZATION FOR SENSOR NETWORKS

(71) Applicant: Sikorsky Aircraft Corporation, Stratford, CT (US)

(72) Inventors: George A. Mathew, Berkeley, CA (US); Kunal Srivastava, Manchester, CT (US); Amit Surana, West Hartford, CT (US); Shaunak D. Bopardikar, El Cerrito, CA (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1020 days.

(21) Appl. No.: 15/326,541

(22) PCT Filed: Jul. 16, 2015

(86) PCT No.: PCT/US2015/040711
§ 371 (c)(1),
(2) Date: Jan. 16, 2017

(87) PCT Pub. No.: WO2016/014328
PCT Pub. Date: Jan. 28, 2016

(65) Prior Publication Data
US 2017/0205490 A1   Jul. 20, 2017

Related U.S. Application Data

(60) Provisional application No. 62/026,768, filed on Jul. 21, 2014.

(51) Int. Cl.
*G01S 5/02* (2010.01)
*G01S 13/08* (2006.01)
(Continued)

(52) U.S. Cl.
CPC ............ *G01S 5/021* (2013.01); *G01S 5/0278* (2013.01); *G01S 13/08* (2013.01); *G01S 13/878* (2013.01); *H04W 16/18* (2013.01)

(58) Field of Classification Search
CPC ........ G01S 5/021; G01S 13/08; G01S 13/878; G01S 5/0278; H04W 16/18
See application file for complete search history.

(56) References Cited

U.S. PATENT DOCUMENTS 6,772,044 B1   8/2004 Mathur et al.
7,395,195 B2   7/2008 Suenbuel et al.
(Continued)

FOREIGN PATENT DOCUMENTS

WO   2010045971 A1   4/2010

OTHER PUBLICATIONS

Amit Surana, et al.; "Coverage Control of Mobile Sensors for Adaptive Search of Unknown Number of Targets", 2012 IEEE International Conference on Robotics and Automation, XP32450837, RiverCentre, Saint Paul, Minnesota, USA, May 14-18, 2012, pp. 663-670.

(Continued)

*Primary Examiner* — Marthe Y Marc-Coleman
(74) *Attorney, Agent, or Firm* — Foley & Lardner LLP (57) ABSTRACT

A method of sensor node position determination for a sensor network is provided. A coverage distribution is defined based on a number of sensor nodes and sensor footprints of the sensor nodes. A desired position for each of the sensor nodes is determined based on the coverage distribution and a prior probability distribution defined on a bounded domain for the number of sensor nodes as a minimization of a distance between the coverage distribution and the prior probability distribution. The desired position to configure the sensor nodes is output.

15 Claims, 6 Drawing Sheets

(51) Int. Cl.
*H04W 16/18* (2009.01)
*G01S 13/87* (2006.01)

(56) References Cited

U.S. PATENT DOCUMENTS

| | | | |
|---|---|---|---|
| 7,701,874 | B2 | 4/2010 | Kline et al. |
| 8,265,870 | B1 | 9/2012 | Nguyen et al. |
| 8,514,283 | B2 | 8/2013 | Nam et al. |
| 2005/0134499 | A1 | 6/2005 | Liu et al. |
| 2006/0253570 | A1 | 11/2006 | Biswas et al. |
| 2007/0038383 | A1 | 2/2007 | Boris et al. |
| 2008/0198004 | A1 | 8/2008 | Luss |
| 2010/0063777 | A1* | 3/2010 | Berkcan ............ G05B 19/042 702/188 |
| 2011/0299470 | A1* | 12/2011 | Muller ............... H04Q 9/00 370/328 |
| 2011/0300880 | A1* | 12/2011 | Muller ............... G01S 5/0289 455/456.1 |
| 2013/0218499 | A1 | 8/2013 | Lemer et al. |
| 2015/0331422 | A1* | 11/2015 | Hartung ............ H04L 12/40013 701/23 |

OTHER PUBLICATIONS

George Mathew, et al; "A Static Coverage Algorithm for Locational Optimization", 51 IEEE Conference on Decision and Control, XP32324319, Dec. 10-13, 2012, Maui, Hawaii, USA, pp. 806-811.
Santpal Singh Dhillon et al.; "Sensor Placement for Effective Coverage and Surveillance in Distributed Sensor Networks", 2003 IEEE Wireless Communications and Networking Conference Record, XP010640010, IEEE Operations Center, Piscataway, NJ, Mar. 16-20, 2003, pp. 1609-1614.
The extended European search report; Application No. 15824622.3; dated Feb. 18, 2018, 9 pages.
PCT International Search Report and Written Opinion; International Application No. PCT/US2015/40711; International Filing Date: Jul. 16, 2015; dated Oct. 13, 2015; pp. 1-12.

* cited by examiner

COVERAGE OPTIMIZATION FOR SENSOR NETWORKS

CROSS REFERENCE TO RELATED APPLICATIONS

The present application is a National Stage Application claiming priority to Patent Application PCT/US2015/040711 filed on Jul. 16, 2015 and to U.S. Provisional Application 62/026,768 filed on Jul. 21, 2014, the contents of which are incorporated herein by reference in their entirety.

BACKGROUND OF THE INVENTION

The subject matter disclosed herein generally relates to sensing systems, and more particularly to sensor placement for coverage in a sensor network.

Sensor networks are incorporated in many types of environments to attain sensing coverage for applications such as security, system health monitoring, indoor air quality monitoring, control applications, unmanned aerial vehicle (UAV) applications including intelligence, surveillance, and reconnaissance, and the like. Sensor placement decisions are needed in a fixed environment as part of a sensor system design, particularly where attempting to attain maximum coverage for a minimum number of sensors. For example, placement of temperature/humidity sensors in an indoor air quality system, cameras for building security, or strain gauges for structure health monitoring typically involves consideration of a number of factors. Larger sensor networks usually increase the number of potential sensor placement decisions. The use of heterogeneous sensors in the sensor network can further increase placement decision complexity.

Sensor placement challenges are also increased when the sensors are mobile, such as when mounted on vehicles. In some environments, a sensor coverage area may be complex due to placement restrictions or specific targets having an arbitrary shape. In order to achieve robust sensor coverage for a given area, sensor performance characteristics, potential movement of sensors, and environmental constraints may impact the ability to determine desired placement of each sensor at any point time. Changes in any of these sensor coverage area determination contributors over time can further complicate sensor placement decisions to adequately maintain sensor coverage.

BRIEF DESCRIPTION OF THE INVENTION

According to an aspect of the invention, a method of sensor node position determination for a sensor network is provided. A coverage distribution is defined based on a number of sensor nodes and sensor footprints of the sensor nodes. A desired position for each of the sensor nodes is determined based on the coverage distribution and a prior probability distribution defined on a bounded domain for the number of sensor nodes as a minimization of a distance between the coverage distribution and the prior probability distribution. The desired position to configure the sensor nodes is output.

In addition to one or more of the features described above or below, or as an alternative, further embodiments could include determining initial deployment positions of the sensor nodes, determining a plurality of partitions to define a search area for each of the sensor nodes, and computing a trajectory for at least one of the sensor nodes based on the partitions.

In addition to one or more of the features described above or below, or as an alternative, further embodiments could include updating the partitions periodically, and modifying the trajectory of one or more of the sensor nodes based on the updating of the partitions.

In addition to one or more of the features described above or below, or as an alternative, further embodiments could include where determining initial deployment positions of the sensor nodes further includes applying a gradient descent to a plurality of distance measurements between the coverage distribution and the prior probability distribution to minimize the distance between the coverage distribution and the prior probability distribution.

In addition to one or more of the features described above or below, or as an alternative, further embodiments could include where each of the sensor nodes is an autonomous vehicle including a local controller, and each local controller computes the trajectory of a corresponding instance of the autonomous vehicle.

In addition to one or more of the features described above or below, or as an alternative, further embodiments could include detecting a change to the prior probability distribution, and reorienting or repositioning one or more of the sensor nodes based on the change.

In addition to one or more of the features described above or below, or as an alternative, further embodiments could include estimating, by each of the sensor nodes, a global state vector that includes positions of every sensor node. The global state vector can be exchanged with a number of neighboring sensor nodes within a communication range of each of the sensor nodes, and the global state vector can be updated at each of the sensor nodes based on a consensus of instances of the global state vector received from the number of neighboring sensor nodes.

In addition to one or more of the features described above or below, or as an alternative, further embodiments could include where the sensor nodes included in the number of neighboring sensor nodes change over a period of time, and the updating of the global state vector further includes performing corrections based on a system state model and the instances of the global state vector received from the number of neighboring sensor nodes.

In addition to one or more of the features described above or below, or as an alternative, further embodiments could include applying a weight matrix to converge a consensus solution to the global state vector.

In addition to one or more of the features described above or below, or as an alternative, further embodiments could include adjusting one or more of the sensor footprints of the sensor nodes based on a visibility field that accounts for one or more obstacles reducing sensor footprint.

According to further aspects of the invention, a sensor position determination system is provided for a sensor network that includes a plurality of sensor nodes. The sensor position determination system includes a processor and memory having instructions stored thereon that, when executed by the processor, cause the sensor position determination system to define a coverage distribution based on a number of sensor nodes and sensor footprints of the sensor nodes. A desired position for each of the sensor nodes is determined based on the coverage distribution and a prior probability distribution defined on a bounded domain for the number of sensor nodes as a minimization of a distance between the coverage distribution and the prior probability distribution. The desired position to configure the sensor nodes is output.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In exemplary embodiments, a sensor position determination system can manage sensor node placement and deployment of a sensor network. The sensor position determination system can be implemented in one or more processing systems to determine sensor node positioning. A sensor node is an apparatus that includes at least one sensor that has an associated sensor footprint. Each sensor node may be moveable or subject to changes in orientation. Sensor positioning determination can be implemented for solving sensor node placement and deployment problems. Sensor node placement refers to determining where a sensor node should be positioned in terms of location and orientation to achieve sensor coverage for an area. Sensor node deployment refers to sensor placement in real time, such as positioning of vehicles having one or more sensor. In an exemplary embodiment, a multi-scale cost function for sensor coverage takes into account prior knowledge, environmental constraints, and sensor characteristics related to field of view and error rates in solving sensor positioning problems. Embodiments are applicable to a wide range of sensor deployment and placement problems related to, for instance, building security and monitoring, and unmanned aerial vehicle (UAV) intelligence, surveillance, and reconnaissance.

Given a number of sensor nodes, sensor coverage can be determined for a prior probability distribution (μ) defined on a bounded domain or region. The prior probability distribution encapsulates the probability of certain events occurring within the bounded domain. An integral of the prior probability distribution over a subset in the bounded domain represents how well the subset should be covered. Each sensor node can have a sensor state that defines a sensor node location, an orientation, and other such parameters. Each sensor node has a sensor footprint based on the sensor state. A sensor footprint may be defined as a distribution that depends on sensor location. Sensor nodes can have different sensor footprints for a heterogeneous sensor network. An average of the sensor footprints for all of the sensor nodes in the bounded domain defines a coverage distribution. A measure of the distance between the coverage distribution and the prior probability distribution can be determined using, for instance, a Sobolev space norm of negative index. The distance between the coverage distribution and the prior probability distribution is computed according to the following equation:

$$\Phi = \frac{1}{2} \sum_k \Lambda_k (c_k - \mu_k)^2$$

where $\mu_k = \langle \mu, f_k \rangle$ and $\Lambda_k = \frac{1}{(1 + \|k\|^2)^{3/2}}$ In the above equations, μ(x) is defined as a prior probability of distribution on a region, $c_k$ is a Fourier coefficient of the coverage distribution (which keeps track of locations collectively covered by the sensor footprints), $\mu_k$ is a Fourier coefficient of the probability distribution μ and k is a wavenumber vector of Fourier basis functions $f_k$.

Figure 1:
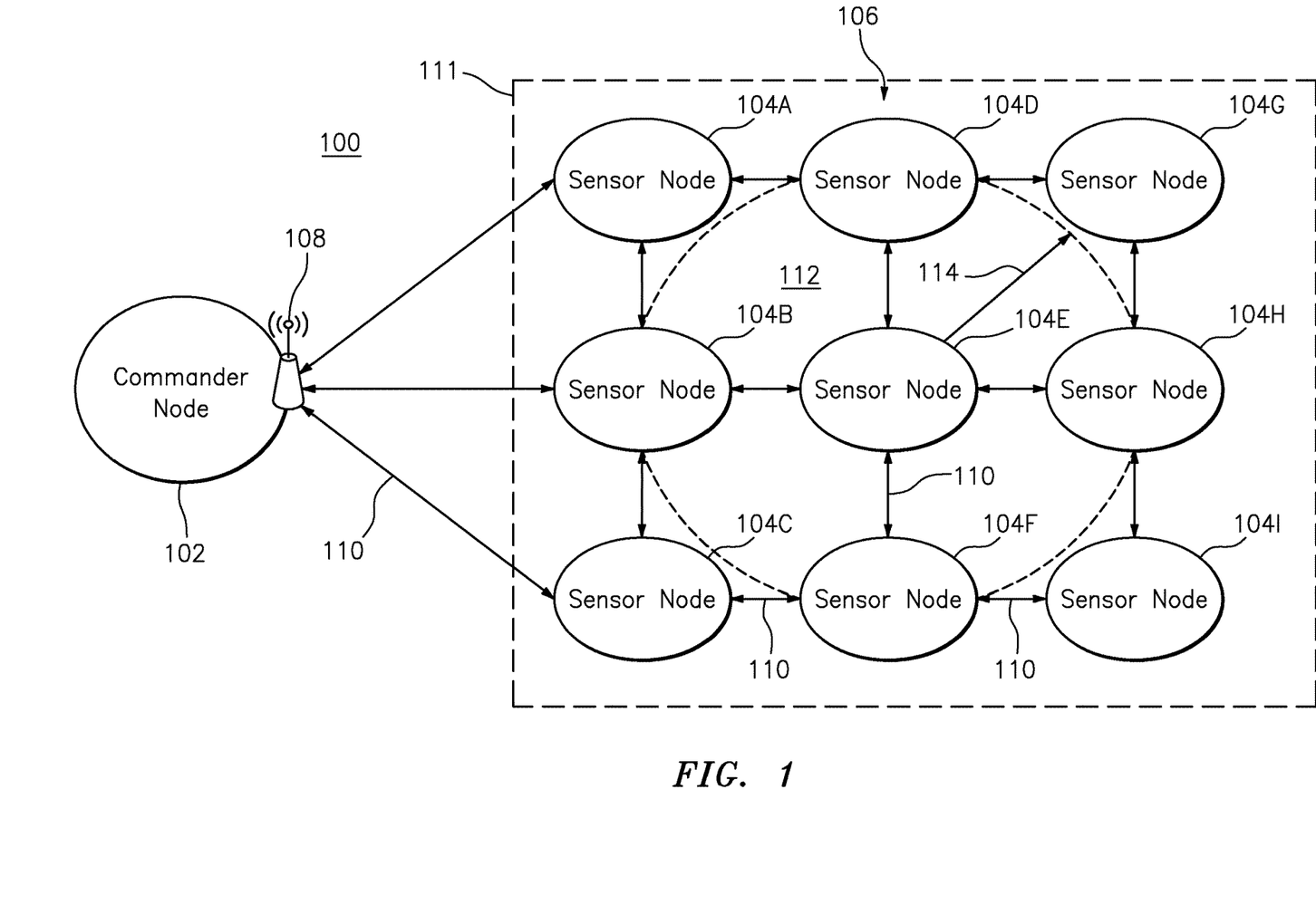
FIG. 1 schematically depicts a sensor network of sensor nodes in accordance with an embodiment.

FIG. 1 schematically depicts a sensing system 100 in accordance with an embodiment. In the example of FIG. 1, a commander node 102 can communicate with sensor nodes 104A-104I that form a sensor network 106. The commander node 102 can be an aerial vehicle, a ground-based vehicle, a watercraft, a mobile device, or a stationary system. In one embodiment, the commander node 102 is a manned air vehicle, such as a fixed wing or rotor wing aircraft. In an alternate embodiment, the commander node 102 is an autonomous aerial vehicle. The commander node 102 can determine control commands for the sensor nodes 104A-104I and relays the control commands through a communication interface 108 to the sensor nodes 104A-104I over communication links 110 of the sensor network 106. The communication links 110 can be wired, wireless, and/or optical links. Where the sensor nodes 104A-104I are implemented in vehicles, the communication links 110 are wireless links. In the example of FIG. 1, the commander node 102 communicates directly with sensor nodes 104A, 104B, and 104C.

Sensor nodes 104A-104C can propagate messages from the commander node 102 to other neighboring sensor nodes in the sensor network 106. For instance, sensor node 104A may communicate with sensor nodes 104B and 104D, and sensor node 104B can also communicate with sensor nodes 104C and 104E. Sensor node 104C can also communicate with sensor node 104F. Sensor node 104D may communicate with sensor nodes 104E and 104G, while sensor node 104E also communicates with sensor nodes 104F and 104H. Sensor node 104F can communicate with sensor node 104I, while sensor node 104H also communicates with sensor nodes 104G and 104I. Communication between the sensor nodes 104A-104I can be performed according to a variety of protocols. In a gossip protocol, a sensor node 104A-104I and one of its neighbors awakes randomly, and they exchange data. In a broadcast protocol, a sensor node 104A-104I awakes randomly and transmits (i.e., unidirectional communication) data to all of its neighbors. Accordingly, in the example of FIG. 1, each of the sensor nodes 104A-104I is operable to establish communication links 110 with one or more of the sensor nodes 104A-104I. Additional communication links 110 can also be implemented between the sensor nodes 104A-104I and/or the commander node 102.

Depending upon communication constraints, embodiments can be implemented using a centralized "dictatorial" approach, where a single sensor node 104A-104I receives, computes, and sends all required information. Another example is a decentralized "anarchical" approach, where peer-to-peer communication and computation is employed, passing through various multi-layered distributed layers, where higher-layer sensor nodes 104A-104I act as a central node for a set of lower-layer sensor nodes 104A-104I (i.e., vertical communication) and higher-layer sensor nodes 104A-104I exchange information among themselves (e.g., horizontal communication).

Although the sensor nodes 104A-104I are depicted in a two-dimensional grid pattern in FIG. 1, it will be understood that a number of distributions can be established by the commander node 102 with different geometries and altitude variations in three-dimensional space. Furthermore, a greater or lesser number of sensor nodes 104A-104I can be included in the sensor network 106 in various non-uniform distributions. While the commander node 102 is depicted separately from the sensor nodes 104A-104I, in an alternate embodiment, one of the sensor nodes 104A-104I has the role of commander node 102 and no separate commander node 102 is used. In another embodiment, functions of the commander node 102 are distributed in multiple sensor nodes 104A-104I, e.g., in a hierarchy of sensor nodes 104A-104I.

In one embodiment, each of the sensor nodes 104A-104I can monitor for control commands or other messages propagated through the sensor network 106 from the commander node 102 or other sensor nodes 104A-104I. The commander node 102 may provide constraint data to the sensor nodes 104A-104I to define a coverage distribution and a prior probability distribution defined on a bounded domain 111 such that the sensor nodes 104A-104I can self-organize according to the constraint data. Alternatively, the commander node 102 can determine desired positions of each sensor node 104A-104I and output the desired positions to configure the sensor nodes 104A-104I. Where the sensor nodes 104A-104I include local controllers, the desired position information can be used to reposition and/or reorient the sensor nodes 104A-104I.

Where the sensor nodes 104A-104I self-organize, each of the sensor nodes 104A-104I can estimate a global state vector that includes positions of every sensor node 104A-104I and exchange the global state vector with a number of neighboring sensor nodes within a communication range. In the example of FIG. 1, a neighborhood 112 of sensor node 104E is defined by communication range 114, where four other sensor nodes 104B, 104D, 104H, and 104F are neighboring sensor nodes. The global state vector at each sensor node 104A-104I can be updated based on a consensus of instances of the global state vector received from the number of neighboring sensor nodes. For instance, sensor node 104E can update its global state vector as a consensus of global state vectors from sensor nodes 104B, 104D, 104H, and 104F as corrections based on a system state model that defines expected positions of the sensor nodes 104A-104I. The sensing nodes 104A-104I included in the number of neighboring sensor nodes can change over time as the sensor node 104E moves and/or other sensor nodes 104A-D and 104F-I move. For instance, sensor node 104A could move within the communication range 114 of sensor node 104E while sensor node 104F moves outside of the communication range 114.

Figure 2:
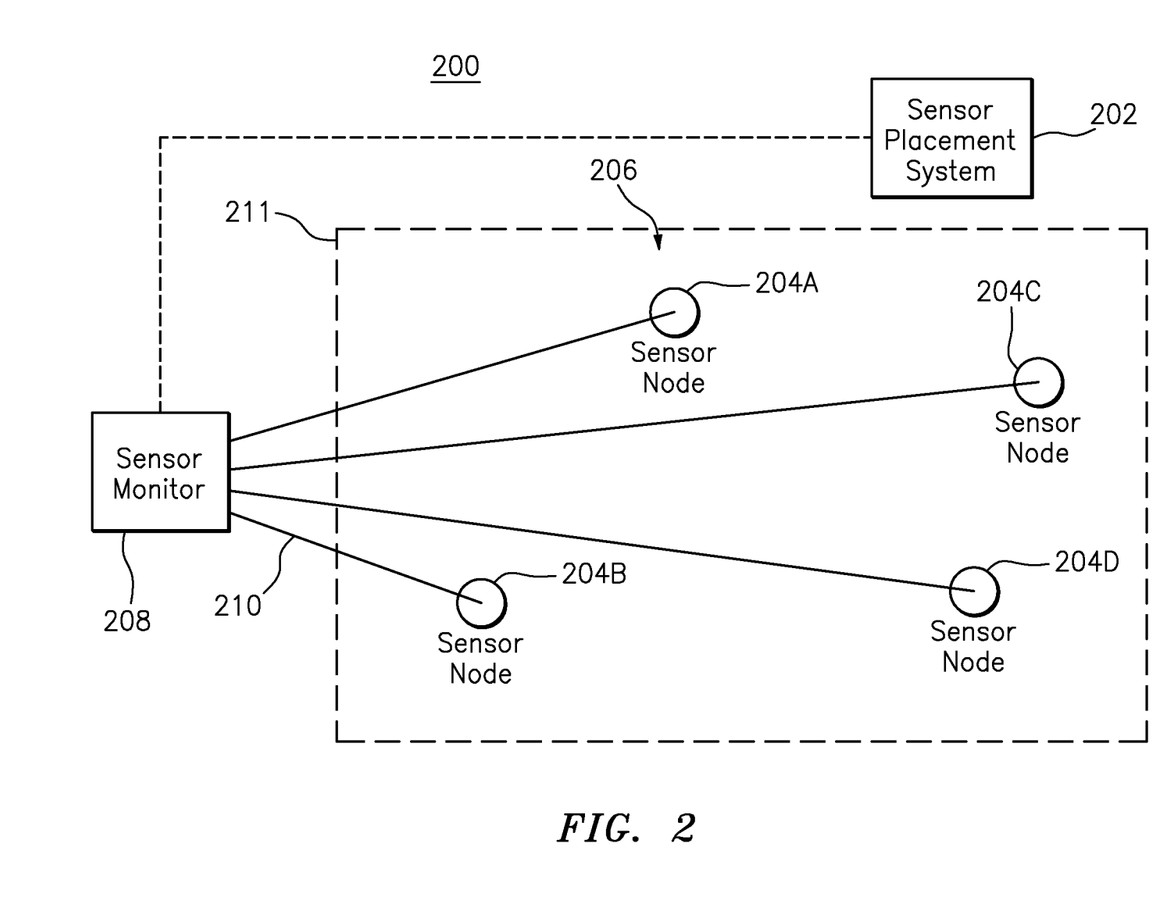
FIG. 2 schematically depicts a sensor network of sensor nodes in accordance with another embodiment.

FIG. 2 schematically depicts a sensing system 200 in accordance with an embodiment. The sensing system 200 of FIG. 2 includes a sensor placement system 202 that determines placement for sensor nodes 204. The sensor nodes 204 can form a sensor network 206; however, the sensor placement system 202 need not be in communication with the sensor network 206. In the example of FIG. 2, a sensor monitor 208 uses a number of communication links 210 to monitor the sensor nodes 204A-204D. The sensor placement system 202 can be implemented as an off-line processing system that does not directly control location and orientation of the sensor nodes 204A-204D. The sensor placement system 202 has information defining a bounded domain 211 in which the sensor nodes 204A-204D are to be located, as well as knowledge of the sensor footprints of the sensor nodes 204A-204D. The sensor placement system 202 can define a coverage distribution based on a number of sensor nodes 204A-204D and sensor footprints of the sensor nodes 204A-204D. The sensor placement system 202 determines a desired position for each of the sensor nodes 204A-204D based on the coverage distribution and a prior probability distribution defined on the bounded domain 211 for the number of sensor nodes 204A-240D as a minimization of a distance between the coverage distribution and the prior probability distribution. The sensor placement system 202 may output the desired position to configure the sensor nodes 204A-204D to a display or a printout to enable technicians to properly position the sensor nodes 204A-204D. Where the sensor monitor 208 can control positioning of the sensor nodes 204A-204D, the sensor placement system 202 can send the desired position information to the sensor monitor 208 to reposition or orient the sensor nodes 204A-204D accordingly.

Figure 3:
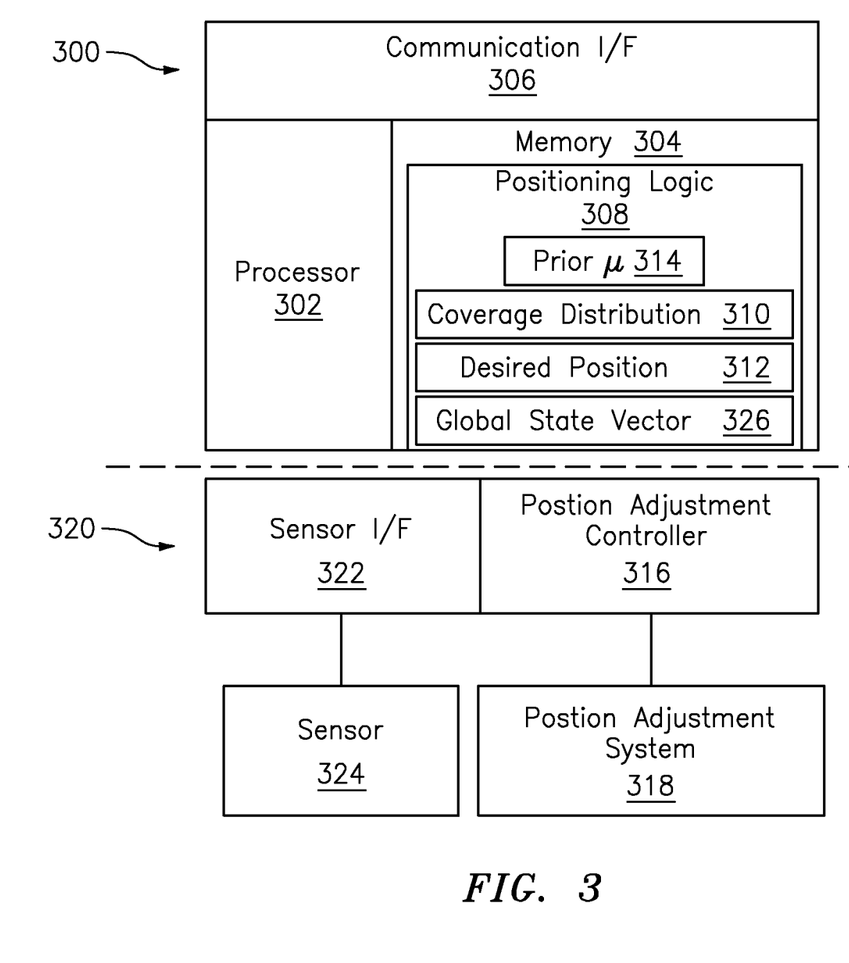
FIG. 3 schematically depicts a block diagram of a sensor position determination system in accordance with embodiments.

FIG. 3 schematically depicts a block diagram of a sensor position determination system 300 in accordance with embodiments. The sensor position determination system 300 can be embodied in one or more of the commander node 102 of FIG. 1, the sensor nodes 104A-104I of FIG. 1, and/or the sensor placement system 202 of FIG. 2. In the example of FIG. 3, the sensor position determination system 300 is a processing system that includes a processor 302, memory 304, and a communication interface 306. The processor 302 can be any type or combination of computer processors, such as a microprocessor, microcontroller, digital signal processor, application specific integrated circuit, programmable logic device, and/or field programmable gate array. The memory 304 is an example of a non-transitory computer readable storage medium tangibly embodied in the sensor position determination system 300 including executable instructions stored therein, for instance, as firmware. Examples of instructions that can be stored in the memory 304 for execution by the processor 302 include positioning logic 308.

The positioning logic 308 can define a coverage distribution 310 based on a number of sensor nodes and sensor footprints of the sensor nodes, such as sensor nodes 104A-104I of FIG. 1 or sensor nodes 204A-204D of FIG. 2. The positioning logic 308 determines a desired position 312 for each of the sensor nodes based on the coverage distribution 310 and a prior probability distribution ($\mu$) 314 defined on a bounded domain for the number of sensor nodes as a minimization of a distance between the coverage distribution 310 and the prior probability distribution 314. Examples of the bounded domain include the bounded domain 111 of FIG. 1 for sensor nodes 104A-104I, and the bounded domain 211 of FIG. 2 for sensor nodes 204A-204D. The desired position 312 can be output to a position adjustment controller 316 that drives a position adjustment system 318 to control sensor node positioning. A positioning and sensing subsystem 320 can include the position adjustment controller 316 and a sensor interface 322. The sensor interface 322 interfaces with at least one sensor 324 of a sensor node, such as the sensor nodes 104A-104I of FIGS. 1 and 204A-204D of FIG. 2. Each sensor 324 has a sensor footprint that can define sensor location, orientation, range, and other sensor state values, where the coverage distribution 310 may be equivalent to the average of all sensor footprints in the sensor network 106 of FIG. 1 or sensor network 206 of FIG. 2. The positioning and sensing subsystem 320 can be local to the sensor position determination system 300 or located remotely. As a further alternative, the position adjustment controller 316 and position adjustment system 318 can be omitted where position adjustments are performed manually.

For sensor node placement without constraints on sensor location, the positioning logic 308 may implement a gradient descent algorithm based on distance measurements between the coverage distribution 310 and the prior probability distribution 314 to converge on a result that minimizes the distance between the coverage distribution 310 and the prior probability distribution 314 across the sensor nodes. This can provide initial deployment positions of sensor nodes which may be subject to further dynamic constraints when deployed in an environment where the sensor nodes can be repositioned, such as vehicle-mounted sensor nodes. A gradient descent algorithm may be implemented as a first-order optimization. To find a localized minimum using gradient descent, steps can be taken that are proportional to the negative of the gradient of the function at a current point.

In one embodiment, updated sensor node locations can be calculated using a gradient descent algorithm to identify waypoints that are commanded to each sensor node. In the context of autonomous vehicles as the sensor nodes, the sensor position determination system 300 can be embodied as a local controller to determine a feasible path to the waypoints. Alternatively, a coverage control law may be derived using, for instance, Pontryagin's principle to derive a coverage control law that satisfies sensor dynamic constraints. Pontryagin's principle can be used to find a best possible control for taking a dynamic system from one state to another in the presence of constraints.

A consensus based approach can be used such that each sensor node may estimate a global state vector 326 that includes positions of every sensor node. A communication range of each sensor node at a time includes a number of neighboring sensor nodes, as depicted in the example of FIG. 1 with respect to neighborhood 112. As time advances, neighboring sensor nodes in the communication range of each sensor node can change based on movement by one or more sensor nodes. Each sensor node may update its estimate of the global state vector 326 based on a system model and corrects its estimate based on consensus on the sensor states received intermittently from its neighbors. A weight matrix can encode the dynamic network structure and may be constructed such that it facilitates convergence of the consensus step under synchronous/asynchronous communication constraints. A parameter captures the number of consensus steps taken per gradient step with time held constant. A one-step consensus update can be used at each time instant. In certain situations when communication occurs at a faster time scale than the rate at which sensor nodes move relative to each other, several consensus steps may be used at each instant to improve the convergence of distributed optimization. A weight matrix is deterministic for a synchronous solution. The weight matrix can satisfy a double stochasticity assumption. For an asynchronous solution, the weight matrix is stochastic and can be constructed under different asynchronous protocols. The weight matrix can be applied to converge to a consensus solution for the global state vector 326.

In order to monitor the convergence of a distributed optimization, a mean trajectory can be calculated, and a consensus error may be measured as a maximum deviation from the mean trajectory.

Computations performed by the positioning logic 308 of FIG. 3 can be extended to three or more dimensions, use prior probability distributions that incorporate probability detection and sensor measurement noise, heterogeneous sensors, and/or provide coverage for general surfaces or manifolds.

Figure 4A:
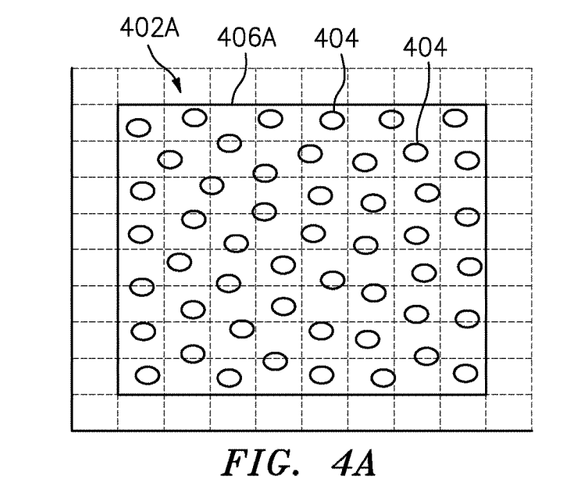
FIGS. 4A-4D depict sensor node placement examples in accordance with embodiments.
Figure 4B:
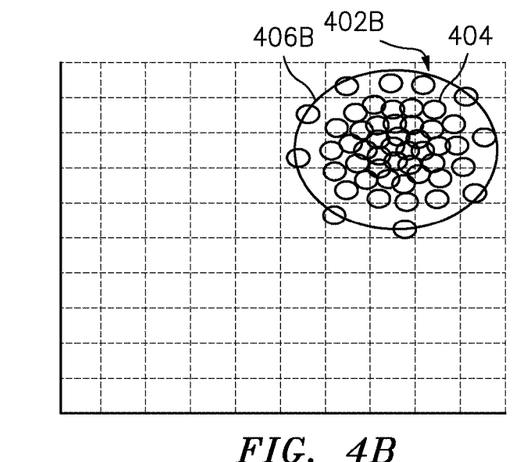
Figure 4C:
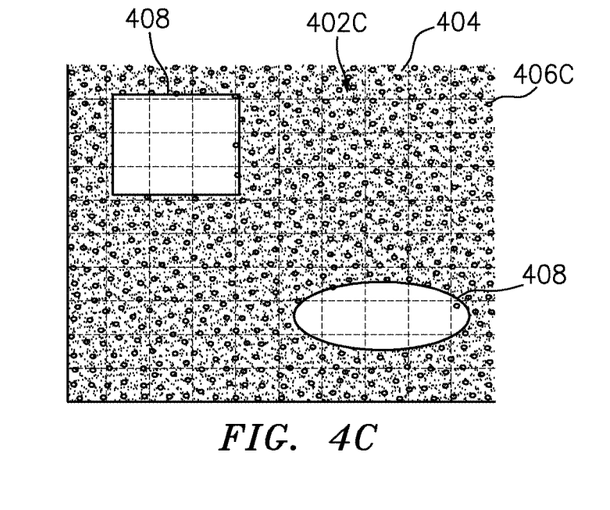

FIGS. 4A-4D depict sensor node placement examples in accordance with embodiments. FIG. 4A is an example of desired positions 402A of sensor nodes 404 calculated with a uniform prior probability distribution 406A. FIG. 4B is an example of desired positions 402B of sensor nodes 404 calculated with a Gaussian prior probability distribution 406B. FIG. 4C is an example of desired positions 402C of sensor nodes 404 calculated with a uniform prior probability distribution on a non-convex region 406C. Various obstacles 408 must be accounted for in the resulting distribution of the desired positions 402C.

Figure 4D:
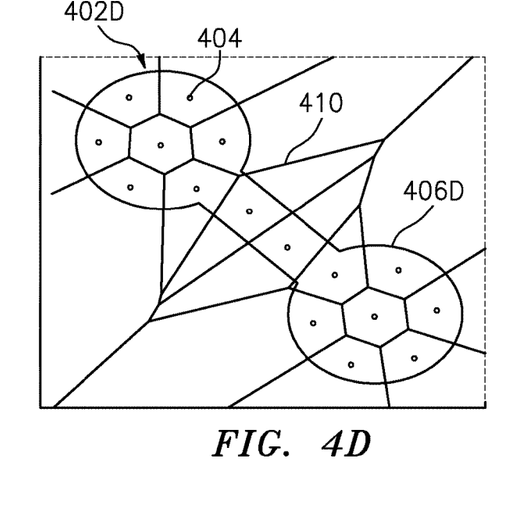

FIG. 4D is an example of desired positions 402D of sensor nodes 404 calculated with a dumbbell-shaped prior probability distribution 406D. FIG. 4D also illustrates an example of a Voronoi partition 410 computed for the equilibrium sensor configuration relative to the dumbbell-shaped prior probability distribution 406D and the number of sensor nodes 404. The example of FIG. 4D employs partitioning for balancing the coverage amongst sensor nodes 404. In each partition, the positioning logic 308 of FIG. 3 can be run independently to search/track targets.

Figure 5A:
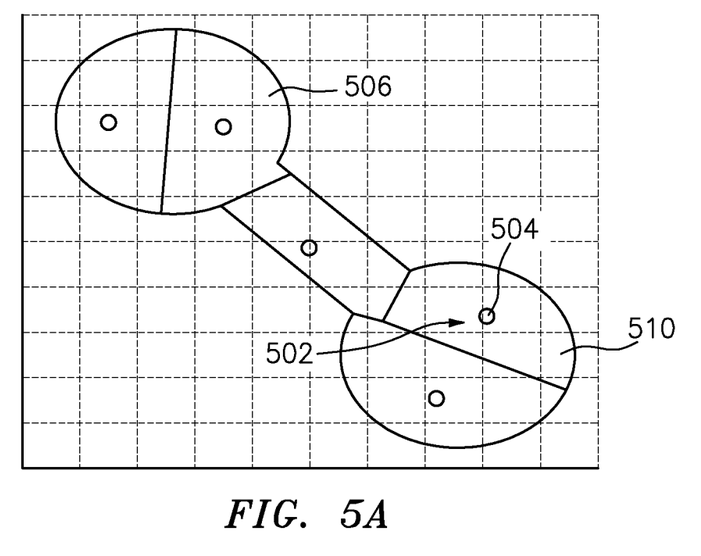
FIGS. 5A-5B depict partition and trajectory examples in accordance with embodiments.

As depicted in FIG. 5A, for dynamic coverage of a prior probability distribution 506 for searching, initial deployment positions 502 of sensor nodes 504 can be determined by a centralized or distributed sensor coverage area determination using, for instance, the positioning logic 308 of FIG. 3. The initial deployment positions 502 represent desired positions before searching begins. The initial deployment positions 502 can be determined, for instance, by applying a gradient descent to a plurality of distance measurements between a coverage distribution and the prior probability distribution to minimize the distance between the coverage distribution and the prior probability distribution. A plurality of partitions 510 can be determined to define a search area for each of the sensor nodes 504. In the example of FIG. 5A, a Voronoi partition is computed for an equilibrium sensor configuration as the partitions 510.

Figure 5B:
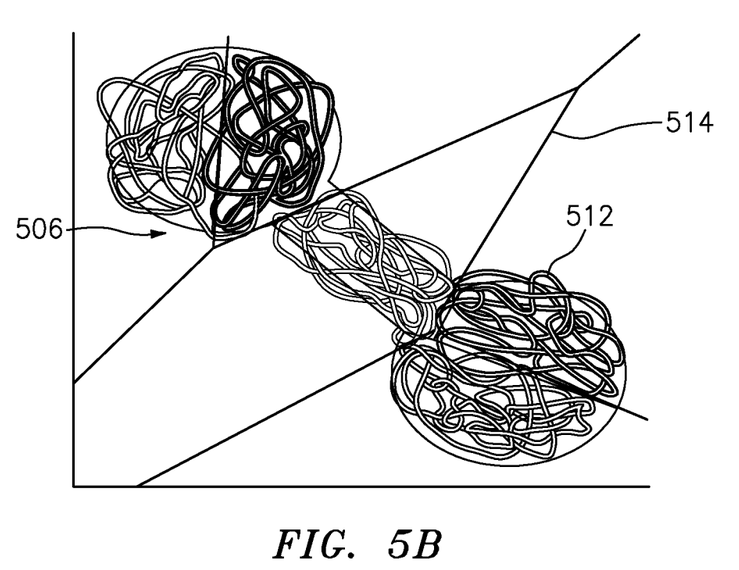

A trajectory for at least one of the sensor nodes 504 can be computed based on the partitions 510. Each sensor node 504 may independently determine its respective trajectory 512 as depicted in FIG. 5B. FIG. 5B also depicts extended partition lines 514 for the partitions 510 of FIG. 5A. Each trajectory 512 can be computed to keep the sensor nodes 504 primarily within a corresponding partition 510 and to focus searching in the partitions 510 as bounded by the prior probability distribution 506. In one embodiment, each of the sensor nodes 504 is an autonomous vehicle including a local controller, such as the sensor position determination system 300 of FIG. 3, and each local controller computes the trajectory 512 of a corresponding instance of the autonomous vehicle. If one of the sensor nodes 504 fails or a new sensor node 504 is made available or the boundaries of the prior probability distribution 506 change, the partitions 510 can be updated periodically, and each trajectory 512 of one or more of the sensor nodes 504 can be modified based on the updating of the partitions 510.

The partitioning of FIGS. 5A and 5B captures space/time constraints, whereby the number of partitions 510 can range from one (entire space) to N (number of sensor nodes 504), and partition size updates can include all the partitions at the same time (e.g., network-wide synchronously) or only pair-wise neighbor partitions (e.g., pair-wise asynchronously) with different intermediate possibilities (e.g., multilayered asynchronously/synchronously). These partition updates can be done using distributed synchronous/asynchronous computations. This approach thus enables consideration of bandwidth limitations, latencies and time-varying connectivity by trading off partition size and communication protocols (asynchronous or synchronous).

Figure 6A:
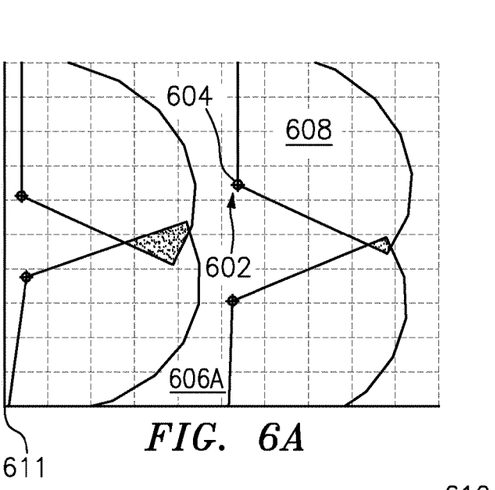
FIGS. 6A-6C depict sensor node placement examples in accordance with embodiments.
Figure 6B:
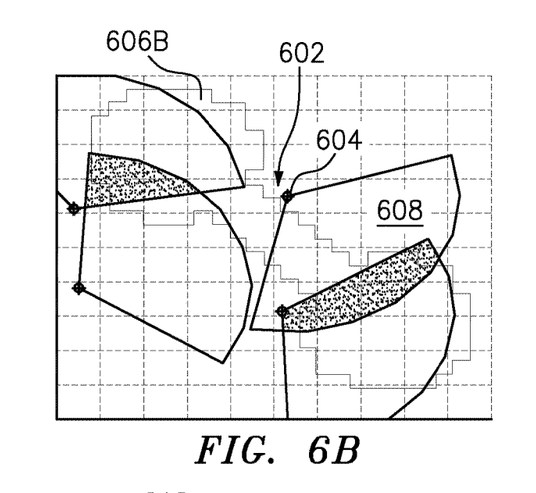
Figure 6C:
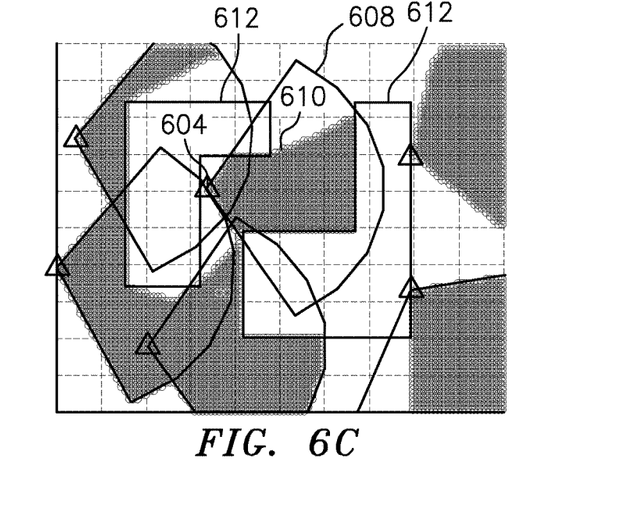

A further example of sensor placement is depicted in FIGS. 6A-6C, where sensor nodes 604 are placed at fixed positions but also support dynamic reorientation of the sensor nodes 604. For example, in a security application involving cameras as sensor nodes 604, orientation and angular velocity can be controlled parameters. The sensor nodes 604 can reorient to cover a changed prior probability distribution. Using a gradient descent algorithm to minimize a cost function, gradients can be computed analytically or through a finite differencing scheme. When applied to a uniform prior probability distribution 606A and a bounded domain 611, four cameras as sensor nodes 604 can have the desired positions 602 with sensor footprints 608 as depicted in FIG. 6A. Based on detecting a change from the prior probability distribution 606A of FIG. 6A to a dumbbell-shaped prior probability distribution 606B of FIG. 6B, one or more of the sensor nodes 604 are reoriented based on the change if the positions 602 of the sensor nodes 604 are constrained. The resulting camera angle response is shown in FIG. 6B as reoriented sensor footprints 608.

If the sensor footprints 608 are also dependent on visibility fields, further constraints are applied. In the context of an indoor security system camera, a visibility field models conditions inside a building where visibility can be severely affected by obstacles. An indicator function can be used denoting a subset of an area which is visible from a given camera location. A visibility field can be computed using ray-tracing methods. As depicted in the example of FIG. 6C, one or more of the sensor footprints 608 of the sensor nodes 604 can be adjusted based on a visibility field 610 that accounts for one or more obstacles 612 reducing sensor footprint. For example, in FIG. 6C, obstacles 612 prevent the full sensor footprint 608 from being available to the sensor node 604, where sensor data are only available in visibility field 610. The presence of the obstacles 612 may result in modifying the desired placement of sensor nodes 604 and/or necessitate additional sensor nodes 604.

Technical effects include determining desired positions for sensor node coverage in a sensor network. Positioning can include static placement or dynamic repositioning of sensor nodes. The desired position determination can be performed remotely or by the sensor nodes.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of sensor node position determination for a sensor network, comprising:
defining a coverage distribution based on a number of sensor nodes and sensor footprints of the sensor nodes;
identifying a prior probability distribution defined on a bounded domain for the number of sensor nodes and indicative of a desired coverage distribution pattern;
determining a desired position for each of the sensor nodes based on the coverage distribution and the prior probability distribution by minimizing a distance between the coverage distribution and the prior probability distribution; and
outputting the desired position to configure the sensor nodes.

2. The method of claim 1, further comprising:
determining initial deployment positions of the sensor nodes;
determining a plurality of partitions to define a search area for each of the sensor nodes; and
computing a trajectory for at least one of the sensor nodes based on the plurality of partitions.

3. The method of claim 2, further comprising:
updating the plurality of partitions periodically; and
modifying the trajectory of one or more of the sensor nodes based on the updating of the plurality of partitions.

4. The method of claim 2, wherein the determining initial deployment positions of the sensor nodes further comprises:
applying a gradient descent to a plurality of distance measurements between the coverage distribution and the prior probability distribution to minimize the distance between the coverage distribution and the prior probability distribution.

5. The method of claim 2, wherein each of the sensor nodes is arranged in a respective autonomous vehicle comprising a respective local controller, and each respective local controller computes the trajectory of a corresponding instance of the respective autonomous vehicle.

6. The method of claim 1, further comprising:
detecting a change to the prior probability distribution; and
reorienting or repositioning one or more of the sensor nodes based on the change.

7. The method of claim 1, further comprising:
estimating, by each of the sensor nodes, a global state vector that includes positions of every sensor node;
exchanging the global state vector with a number of neighboring sensor nodes within a communication range of each of the sensor nodes; and
updating the global state vector at each of the sensor nodes based on a consensus of instances of the global state vector received from the number of neighboring sensor nodes.

8. The method of claim 7, wherein the sensor nodes included in the number of neighboring sensor nodes change over a period of time, and the updating of the global state vector further comprises performing corrections based on a system state model and the instances of the global state vector received from the number of neighboring sensor nodes.

9. The method of claim 7, further comprising:
applying a weight matrix to converge a consensus solution to the global state vector.

10. The method of claim 1, further comprising:
adjusting one or more of the sensor footprints of the sensor nodes based on a visibility field that accounts for one or more obstacles reducing sensor footprint.

11. A sensor position determination system for a sensor network comprising a plurality of sensor nodes, the sensor position determination system comprising:
a processor; and
memory having instructions stored thereon that, when executed by the processor, cause the sensor position determination system to:
define a coverage distribution based on a number of sensor nodes and sensor footprints of the sensor nodes;
identify a prior probability distribution defined on a bounded domain for the number of sensor nodes and indicative of a desired coverage distribution pattern;
determine a desired position for each of the sensor nodes based on the coverage distribution and the prior probability distribution by minimizing a distance between the coverage distribution and the prior probability distribution; and
output the desired position to configure the sensor nodes.

12. The sensor position determination system of claim 11, wherein the instructions further cause the sensor position determination system to:
determine initial deployment positions of the sensor nodes;
determine a plurality of partitions to define a search area for each of the sensor nodes; and
compute a trajectory for at least one of the sensor nodes based on the plurality of partitions.

13. The sensor position determination system of claim 11, wherein the instructions further cause the sensor position determination system to:
detect a change to the prior probability distribution; and
reorient or reposition one or more of the sensor nodes based on the change.

14. The sensor position determination system of claim 11, wherein the instructions further cause the sensor position determination system to:
estimate a global state vector that includes positions of every sensor node;
exchange the global state vector with a number of neighboring sensor nodes within a communication range; and
update the global state vector on a consensus of one or more instances of the global state vector received from the number of neighboring sensor nodes.

15. The sensor position determination system of claim 11, wherein the instructions further cause the sensor position determination system to adjust one or more of the sensor footprints of the sensor nodes based on a visibility field that accounts for one or more obstacles reducing sensor footprint.

* * * * *